United States Patent [19]

Russell

[11] Patent Number: 5,082,364
[45] Date of Patent: Jan. 21, 1992

[54] RF MODULATED OPTICAL BEAM DISTANCE MEASURING SYSTEM AND METHOD

[76] Inventor: James T. Russell, 15305 SE. 48th Dr., Bellevue, Wash. 98006

[21] Appl. No.: 576,612

[22] Filed: Aug. 31, 1990

[51] Int. Cl.[5] .............................. G01C 3/08
[52] U.S. Cl. ............................... 356/5
[58] Field of Search ..................... 356/5, 28.5

[56] References Cited

U.S. PATENT DOCUMENTS

| | | | |
|---|---|---|---|
| 3,619,057 | 11/1971 | Castellano et al. | 356/5 |
| 3,779,645 | 12/1973 | Nakazawa et al. | 356/5 |
| 3,950,100 | 4/1976 | Keene et al. | 356/5 |
| 4,093,380 | 6/1978 | White | 356/5 |
| 4,403,857 | 9/1983 | Hölscher | 356/5 |
| 4,531,833 | 7/1985 | Ohtomo | 356/5 |
| 4,537,502 | 8/1985 | Miller et al. | 356/5 |
| 4,715,706 | 12/1987 | Wang | 356/5 |
| 4,743,110 | 5/1988 | Arnaud et al. | 356/5 |
| 4,744,653 | 5/1988 | Sano et al. | 356/5 |
| 4,916,536 | 4/1990 | Kerr et al. | 358/107 |

OTHER PUBLICATIONS

R. Dändliker, "Two Wavelength Laser Interferometry Using Superheterodyne Detection", *Optics Letters*, May 1988, vol. 13, No. 8, pp. 339–341.
C. Williams, "Absolute Optical Ranging with 200-nm Resolution", *Optics Letters*, Jun. 1989, vol. 14, No. 11, pp. 542–544.
I. Adrianova, Design Principles of Phase Optical Rangefinders with Microwave-Modulated Radiation, pp. 846–855.
Lefevre et al., "Vernier Chronotron", *The Review of Scientific Instruments*, vol. 30, No. 3, pp. 159–166, Mar. 1959.

*Primary Examiner*—Linda J. Wallace
*Attorney, Agent, or Firm*—Larry A. Jackson

[57] ABSTRACT

A first or ranging light beam which functions as a carrier is amplitude modulated with a first radio frequency $f_1$; a second amplitude modulated light beam source functions as a local signal at a frequency $f_2$ for a heterodyne conversion of the first frequency $f_1$; and an electro-optical detector receives both modulated light beams and functions as a mixer. Electro-optical heterodyning of the modulations on the ranging and local source light beams is accomplished by mixing RF modulations on the first light beam with RF modulation on the second light beam in the electro-optical detector to thereby produce a resultant, relatively lower difference frequency $(f_1 - f_2)$ that is more readily processed by available electronic components. Distance measurement is represented by a phase shift of the relative low frequency difference of the heterodyned modulation signals when compared to a reference, unshifted phase of the same frequency.

20 Claims, 7 Drawing Sheets

RF MODULATED OPTICAL BEAM DISTANCE MEASURING SYSTEM AND METHOD

BACKGROUND OF THE INVENTION

1. Field of the Invention

The present invention relates generally to an optical distance measurement system and in particular to such a system which provides precision measurement using radio frequency modulated laser beams.

2. Background Art

In current electromagnetic distance measurement technology, lengths are determined based on the time it takes electromagnetic energy to travel from one end of a line to the other and return. This electromagnetic energy can be light, either visible or infrared; microwave; or radio wave which transmits energy having very long wavelengths. The electromagnetic energy, especially light and microwave, may be modulated. Generally, this equipment measures distances by comparing a line of unknown length to the known wavelength of the electromagnetic energy or the modulation wavelength and operates by measuring phase shift. The returned electromagnetic energy goes through a complete 360' phase change for every integer multiple of exactly one-half of the wavelength which separates the line's endpoints. When the line is not an integer multiple of one-half of the wavelength, the fractional part shows as a non-zero phase change which can be converted to distance.

Most current electronic distance measurement instruments, particularly interferometer devices that use unmodulated light, resolve the fractional wavelengths but do not count the absolute total number of full wave cycles which the returned electromagnetic energy has gone through. To resolve this unknown factor, some equipment (not based on interferometer principles) transmits additional modulated energy of lower frequency and hence longer wavelength as a coarse measurement.

One problem encountered with prior art modulated light, microwave or RF (that is non-interferometer equipment) measurement is that it is not accurate enough for precision range and object measurements such as encountered in machine tool work, because of the long wavelengths associated with practical RF frequencies. There is, therefore, difficulty in determining fine resolution between the phase output of the return and reference phases. Interferometer type distance measuring systems using unmodulated light have sufficient resolution, but there is the problem of aligning and resolving light wavefronts since an optical interferometer uses only the relationship of the light phase. The necessary high resolution phase measuring circuitry is difficult to implement at the much higher frequency of light and does not resolve ambiguities as required for absolute distance measurement.

Known Tellurometer equipment is used for surveying because it is able to measure distance along a beam of modulated light. However, the resolution of the Tellurometer type unit is a millimeter or so, which is suitable for land surveying, but not for machine tool or the like that requires resolution down to the order of 0.01 micron.

U.S. Pat. No. 3,779,645 to Nakazawa, et al, discloses a distance measuring device which uses an amplitude-modulated light wave to measure the phase difference between the transmitted and the received modulated wave to thereby determine distance. Intensity modulation is used to compensate for changes in the diminution of the transmit signal over the range to the distant target and return.

U.S. Pat. No. 3,950,100 to Keene, et al, discloses a laser heterodyne system in which received reflections of light are amplified in a laser. The amplified reflections are heterodyned with the light from the laser and the resulting beat frequency is detected with a photodetector.

U.S. Pat. No. 4,093,380 to White teaches an optical system which uses a three-wave heterodyne detector wherein two optical frequencies are supplied by the input signal so as not to require a local source of optical radiation. This system uses a sophisticated solid state three component mixer detector.

U.S. Pat. No. 4,403,857 to Holscher discloses a distance measuring device which uses a modulated light source wherein phase differences are compared to determine distance. This system is an example of the Tellurometer system.

U.S. Pat. No. 4,537,502 to Miller, et al, discloses a multiple discrete frequency device which comprises a modulated carrier frequency transmitter and a generator for generating at least two modulating signals. Two optical beams of coherent light having closely related frequencies are mixed in an optical mixer.

U.S. Pat. No. 4,715,706 to Wang discloses a laser Doppler range finder for use in measuring the displacement of a moving target.

U.S. Pat. No. 4,743,110 to Arnaud, et al, discloses a laser telemetry and Doppler measurement system which uses a periodic pulsed transmission laser.

U.S Pat. No. 4,774,653 to Sano et al. discloses a method and apparatus for measuring a distance to an object using two laser beams. Switched lasers are used to resolve ambiguity.

U.S. Pat. No. 4,916,536 to Kerr, et al, discloses an imaging range finder which has a transmitting section which directs radiation across an angular field of view by rotating a mirror. The receiving section also has a rotating mirror which collects any reflected radiation. Range is determined by radiation modulation.

R. Dandliker, R. Thalmann, D. Prongue, Optics Letters' May 1988, Vol. 13, No. 8, p. 339–341, discloses the generation of synthetic wavelengths to reduce the sensitivity or to extend the range of unambiguity in interferometric measurements.

C. C. Williams and H. K. Wickramasinghe, "Absolute Optical Ranging with 200 mm Resolution", *Optics Letters*, June 1, 1989, Vol. 14, No. 11, p. 542–544, discloses the combining of single and multiplexed wavelength interferometric measurements to achieve unambiguous distance measurement with nanometer resolution.

I. I. Adrianova, V. G. Vafiadi, V. V. Volkonsky, Z. V. Nesterova, Yu V. Popor, and A. F. Shilor, *Design Principles of Phase Optical Rangefinders with Microwave-Modulated Radiation*, p. 846–855, discloses microwave-modulated light used for distance measurement in optical rangefinders.

SUMMARY OF THE INVENTION

In order to overcome problems and limitations in the prior art, there is provided by the present invention an apparatus and method for achieving a sensitive measurement of the shifting of phase of a relatively high frequency short wavelength RF signal modulated on a light beam carrier and traveling over the distance to and from the target. The electronic measurement is made in a phase comparison of two relatively low frequency difference signals resulting from a heterodyne process. This is accomplished by means of a first ranging light beam which functions as a carrier that is amplitude modulated; a second amplitude modulated light beam source functioning as a local signal for a heterodyne conversion; and an electro-optical detector which receives both modulated light beams and functions as a mixer. Electro-optical heterodyning of the modulations on the first and second light beams is accomplished by mixing RF modulation on the first light beam with RF modulation on the second light beam in the detector to thereby produce a resultant, relatively lower difference frequency that is more readily processed by available electronic components. Distance measurement is thereby represented by a phase shift of the relatively low frequency difference of the heterodyned modulation signals on the first and second light beams.

A reference phase signal is developed and compared in phase to the resultant range dependent phase of the low frequency difference signal in order to quantify the distance measurement. This reference signal is obtained by electronically mixing first and second radio wave frequencies, respectively used to modulate the first and second light beams prior to these frequencies being modulated on to the light beams, or, alternatively, the reference is developed by electro-optically heterodyning the first and second radio wave frequencies after modulation and before transmission of the first light beam to the target.

Comparison of the phase of the resultant range dependent signal that is developed by the detector mixing of the first and second radio wave frequencies with the phase of the reference radio frequency thereby provides a precise measurement of the distance to and from the target. Sensitive electronic distance measurement is accomplished because the relatively low frequency difference of the resultant heterodyned modulations on the first and second light beams has a phase variation that bears a direct relationship to phase shifting of the much higher first RF frequency modulation on the ranging light beam.

Still another radio frequency signal is modulated on the first light beam to provide coarse measurement of the distance. In one embodiment the coarse radio frequency is developed by electro-optically heterodyning dual frequency modulations present on the first (ranging) light beam in the detector. Or, as in another embodiment, the coarse radio frequency is amplitude modulated directly on to the ranging light beam along with the first radio frequency.

It is therefore an object and advantage of the present invention to provide an electronic measuring device which can measure long as well as shorter distances, such as size of objects, with greater accuracy than previously accomplished.

It is another object and advantage of the present invention to provide an electronic measurement device that is not restricted to or dependent on the precise wavelength of light frequency for measurement.

It is yet another object and advantage of the present invention to provide an electronic measurement device that can determine fine resolution between the phase output of the return and reference phases and at the same time resolve ambiguities in such fine measurement.

It is still another object and advantage of the present invention to provide an electronic measurement device which can use a more simplified phase measuring system than that required to measure light phase change.

These and other objects and advantages will be seen from a review of the following detailed description of the invention and drawings.

DESCRIPTION OF THE EMBODIMENTS

Figure 1:
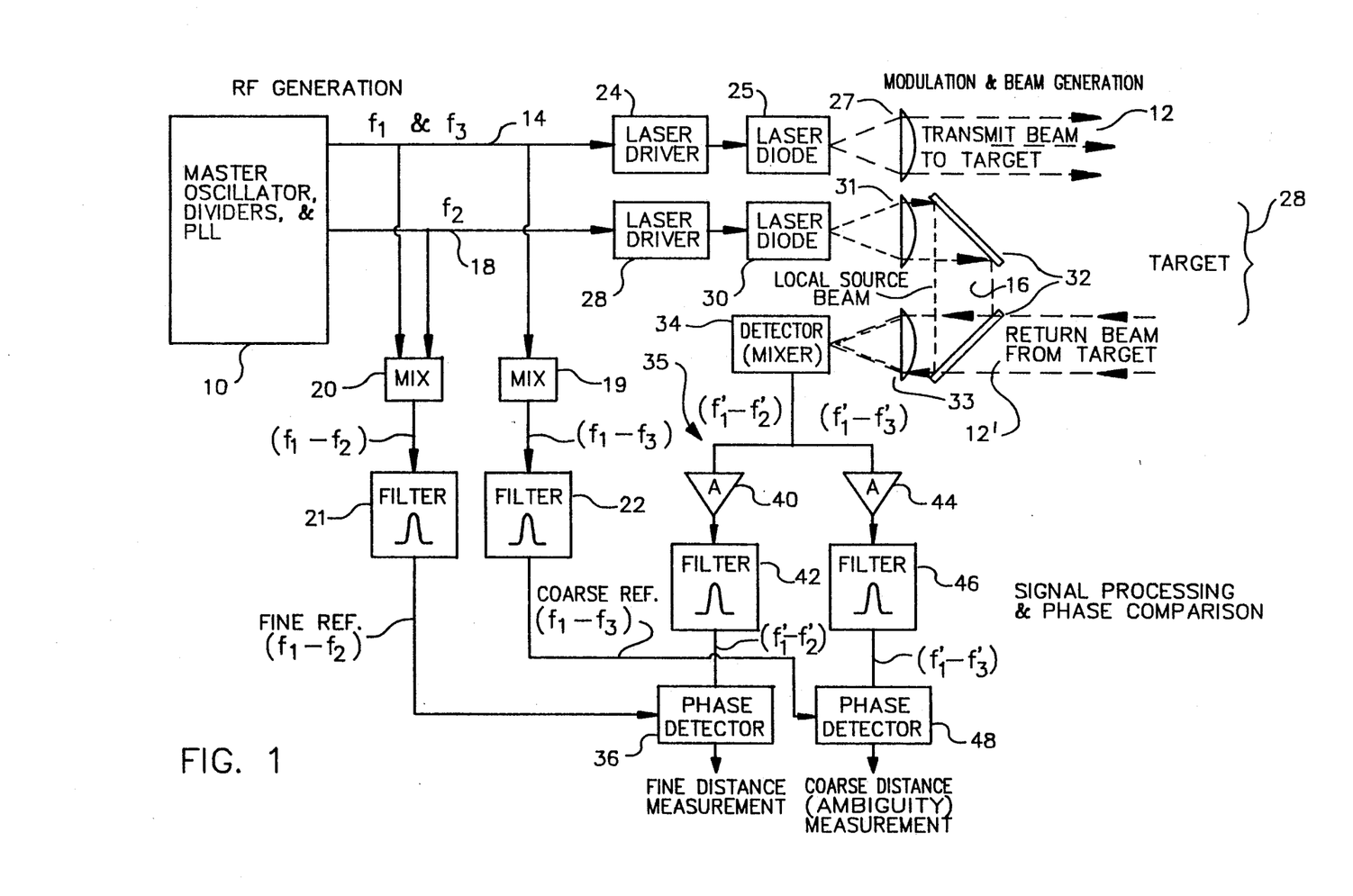
FIG. 1 is a schematic diagram of the preferred embodiment illustrating the operating principles of the present invention.

Referring to the drawings in general, and in particular to FIG. 1, there is shown a schematic diagram of the preferred embodiment of the present invention. A master oscillator and divider circuit 10 generates the radio frequency signals for modulating the electro-optical components. A first RF signal $f_1$ is output on line 14 to a laser driver 24 for amplitude modulating laser diode 25. This arrangement produces a first laser beam 12 serving as a ranging carrier for signal $f_1$, chosen for this embodiment to be at a frequency of 3000 MHz. A second laser beam 16 is similarly amplitude modulated with a second radio frequency signal $f_2$ output on line 18 by means of laser driver 28 and laser diode 30. The second frequency $f_2$ is chosen to have a value different from but close to $f_1$ so that a heterodyne operation produces a difference frequency $f_1' - f_2'$, where $(f_1' - f_2') << $ either $f_1$ or $f_2$, and here $f_2$ is selected to be 3000.010 MHz. The difference value, 10 KHz, is extracted by an optical mixer to represent a fine distance measure that varies with distance dependent phase shifts of $f_1$ in the ranging laser beam 12.

A reference phase difference component $f_1 - f_2$, (i.e., 10 KHz) is developed by an electronic mixer 20 prior to the optical modulation. It is produced in the embodiment of FIG. 1 by electronically mixing the first ($f_1$) and second ($f_2$) radio frequencies directly from output lines 14 and 18 (3000 MHz and 3000.01 MHz, in this example). The difference signal from mixer 20 is passed through an electronic filter 21 and then fed as a fine reference phase signal to a phase comparison stage of the system.

To provide a coarse distance measurement for resolving ambiguous fine phase measurement of the 10 KHz difference signal, another radio frequency signal ($f_3$) chosen here to be 3000.600 MHz is output on line 14 along with $f_1$. The signal $f_3$ also modulates the first (ranging) laser beam 12 via laser driver 24 and the laser diode 25 so that ranging beam 12 carries dual modulation frequencies including this additional (coarse) phase information.

The choice of $f_1 = 3000$ MHz, $f_2 = 3000.010$ MHz and 3000.600 is used as an example only, and as will later be described, other suitable values may be used. Higher first frequencies $f_1$ would give more precise fine resolution, but would also make modulation of the light beam more difficult or expensive. The chosen value of 3000 MHz for $f_1$ is well within the state of the art for diode laser modulation.

At the output of laser diode 25, the first (or ranging) laser beam 12 is collimated by optics 27 and transmitted to the target 28 which is at the distance (or extent or size of an object) to be measured. Laser beam 12 is reflected off the target 28 and is back-scattered (perfect optical reflection, though desirable from the standpoint of signal strength, is not needed) to the instrument as return beam 12'. The second (local) laser beam 16 developed by laser diode 30 and collimating optics 31 is not propagated to the target but rather is redirected in the instrument by diagonal mirror beam splitter combining optics 32 so as to be combined with the return ranging beam 12' and focused by optics 33 on detector 34.

The light beam 16 functions as a local source when modulated with the second radio frequency signal $f_2'$ (e.g., 3000.010 MHz) and is heterodyned in the mixing detector 34 with the first modulation radio frequency $f_1'$ (i.e. 3000 MHz) on ranging beam 12 and return beam 12' to yield a difference of 10 KHz. Because this difference frequency, e.g. 10 KHz, is from a heterodyne process $(f_1' - f_2')$ with a local (non-ranging) frequency source, i.e., $f_2'$, its phase represents an electro-optically detectable, relatively low frequency version of the range dependent phase of the much higher $f_1'$ modulation frequency, here being 3000 MHz.

The combined heterodyne beams 16 and 12' are focused on the mixing detector 34 via the optics 33. As a result, a 10 KHz difference signal from the detector 34 is fed to a phase measuring circuit 35 which processes the phase information signal to give a readout proportional to the fine distance measurement.

More particularly, mixing detector 34 will respond to the frequency differences between the three modulations since it is a square law device. The sums, differences and fundamentals could be available at the detector's 34 output. However, the relatively low speed of the electronic carriers and the capacitance of the detector 34 and the frequencies of the mixed signals are such that only the difference components are low enough in frequency to provide a significant detector output. Thus detector mixer 34 outputs an optically heterodyned difference signal $f_1' - f_2'$ (10 KHz) which contains the fine distance dependent phase, and the coarse distance dependent difference signal $f_1' - f_3'$ (600 KHz). There will also be secondary differences of 590 KHz and 610 KHz. These are removed by the electronic filter 46.

The reference 10 KHz radio frequency developed electronically by mixer 20 and filter 21 is also fed to the phase measuring circuit 35. Phase comparison of the optically heterodyned difference frequency $f_1' - f_2'$ from detector 34 with the fine reference phase $f_1 - f_2$ from mixer 20 and filter 21, occurs in phase detector 36. The distance dependent difference signal $f_1' - f_2'$ is amplified by amplifier 40 and filtered by narrow pass filter 42 prior to the phase detection. The resulting phase shift indicates a precise (fine) measurement of distance.

In this fine measurement signal processing there can be an ambiguity of n wavelengths if the distance changes more than 5 cm since a target shift of 5 cm gives a combined phase shift at the detector 34 of 10 cm or one wavelength of the primary modulation frequency $f_1 = 3000.00$ MHz signal. Since the first laser beam 12 is also modulated at 3000.600 MHz, the effective wavelength of the difference $f_1' - f_3'$ is 600 KHz. In this manner, the target distance can be simultaneously measured with a coarse ambiguity of 250 meters (corresponds to the wavelength of 600 KHz), thereby removing the 5 cm ambiguity. Amplifier 44 and narrow pass filter 46 process the 600 KHz coarse distance signal prior to phase comparison by detector 48 with a reference phase, also of 600 KHz, developed in this embodiment by taking the difference $f_1 - f_3$ from an electronic mixer 19 fed by the dual modulations $f_1$ and $f_3$ on line 14. This coarse reference phase signal $f_1 - f_3$ is passed in narrow pass filter 22 having an output coupled to coarse phase detector 48.

Figure 2:
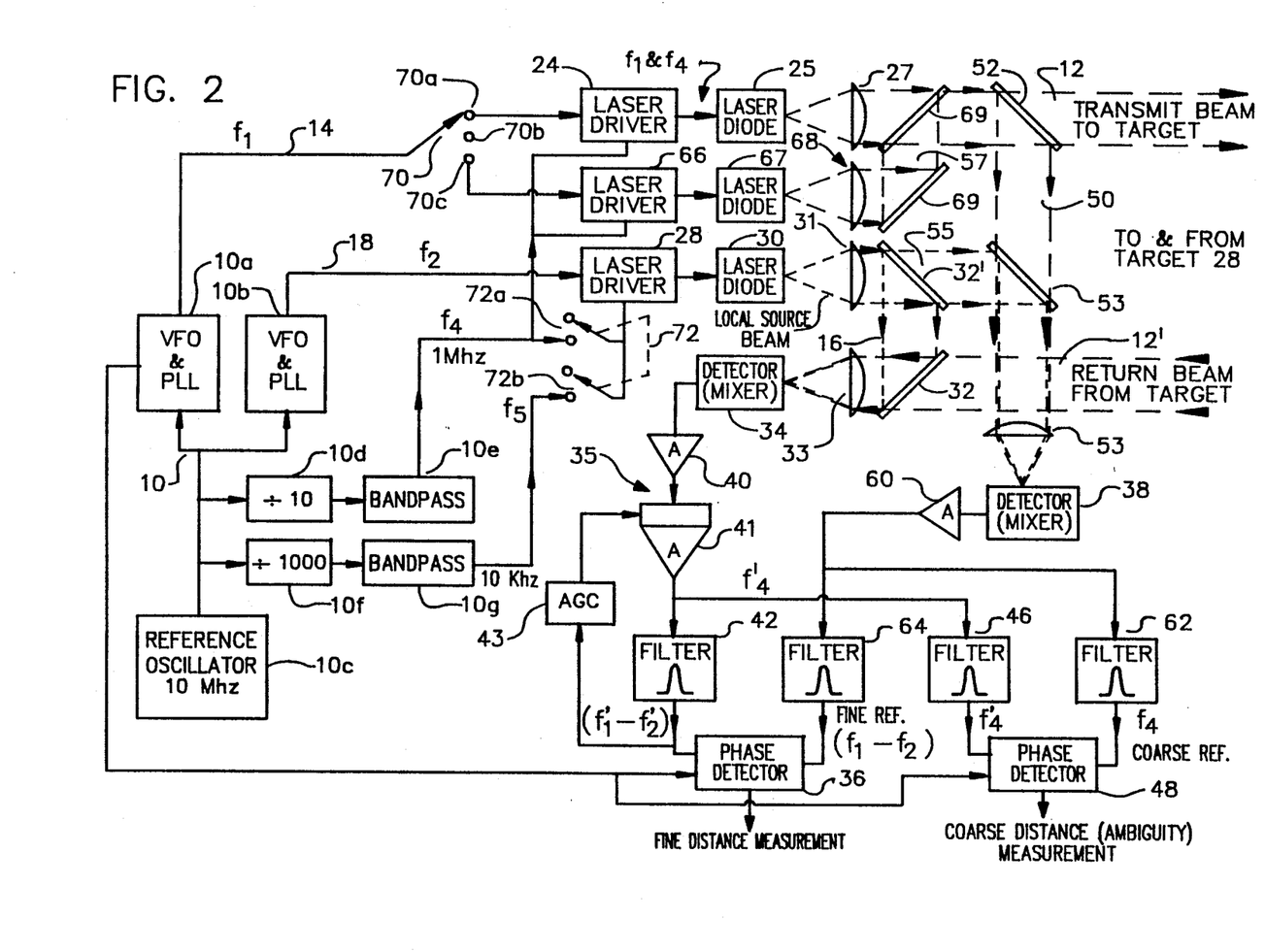
FIG. 2 is a schematic diagram of an alternative embodiment of the present invention.

FIG. 2 of the drawing shows an alternative embodiment of the invention constructed so as to eliminate unwanted phase shifts occurring in the laser driver and laser diode stages of the system and to calibrate the processing electronics and filters. Such phase shifts can corrupt the accuracy of the ultimate phase comparisons that produce the fine and coarse measurements. Thus, in FIG. 2, the system provides for developing the fine and coarse phase reference signals from the optical output side of the laser diodes rather than upstream in the electronics as provided by mixers 19 and 20 and band pass filters 21 and 22 of FIG. 1. More particularly, in FIG. 2, there is shown a second electro-optical detector (and mixer) 38 that receives modulated non-ranging light beams from both laser diode 25 and laser diode 30. The light energy from these diodes after mixing in detector 38 contain the reference fine phase $f_1 - f_2$ and a coarse reference phase $f_4$. The coarse reference phase $f_4$ is selected in this embodiment at a 1 MHz level (rather than the 600 KHz of the FIG. 1 embodiment) and is generated in the master oscillator and divider and phase lock loop circuit 10 and applied to laser diode 25 by modulating laser driver 24 directly with the coarse reference frequency $f_4 = 1$ MHz. The effect of such direct modulation is to place a coarse phase reference on the ranging light beam 12 as well as on to a reference light beam 50 extracted by beam splitter 52 substantially immediately at the output of laser diode 25. Thus both the ranging beam 12 and the reference beam 50 contain the amplitude modulated coarse phase reference frequency $f_4$ developed in the laser diode 25 and the primary frequency $f_1$. On beam 12, $f_1$ serves as a distance dependent phase measure, and on beam 50, $f_1$ provides a local (non-ranging) source for developing the fine reference phase of $f_1 - f_2$.

The reference beam 50, containing the coarse phase frequency $f_4$, is combined with phase information from beam splitter and focusing optics 53 that extract light from another reference beam 55 that contains the local source frequency $f_2$ developed by laser driver 28 and laser diode 30. Beam 55 is developed by a diagonal beam splitter 32 (replacing the diagonal mirror used in FIG. 1 embodiment at the output optics 31 for diode 30). Thus, the reference light beams 50 and 55, when combined and mixed in electro-optical detector 38, develop the following reference phase signals from optical outputs of the laser diodes and hence without any distance dependent phase shifts due to ranging transmission and return. First, in the coarse reference light beam 50, the reference frequency $f_4$ being amplitude modulated information is directly detected in detector 38 and amplified in an amplifier 60 and applied through a band pass filter 62 to the coarse reference phase input of phase detector 48 as illustrated. The reference light beam 50 also contains the primary frequency $f_1$, however, without any phase shift due to ranging transmission. The $f_1$ component of the optical beam 50 is mixed with the offset modulation frequency $f_2$ contained in reference beam 55 and the mixed difference $f_1-f_2$ is detected by detector 38 and applied through amplifier 60 and another band pass filter 64 to one input of phase detector 36 as the find reference phase $f_1-f_2$.

Since these reference phase signals are developed at the output side of the laser drivers and laser diodes, they incorporate any phase shifts that have occurred in the beam generating and modulating components of the system. The ranging beam 12 and its return 12' also contain these phase shifts and hence the ultimate distance measurements are automatically compensated for these unwanted but inevitable phase shifts occurring in the upstream portions of the system.

Another modification provided in the embodiment of FIG. 2, compared to FIG. 1, is the provision of an index calibrating beam 57, termed an achromatizing beam, developed by an additional laser driver 66 and associated laser diode 67. The wavelength of $f_1$ depends on the velocity of light in the transmission medium. In the usual case, air will be the transmission medium. The index of refraction of air, which is the ratio of velocity in a vacuum to that in the medium, will change with temperature, humidity, and pollutant vapors. The index of refraction is also a function of the wavelength (color) of the light carrier. By measuring the difference in apparent distance between two color carriers, the approximate true (i.e., vacuum) velocity is obtained from an experimentally determined look-up table.

The output of the achromatizing beam formed by laser diode 67 is collimated in collimating optics 68 and deflected and combined in diagonal mirror and beam splitter optics 69 with the ranging beam 12 and reference beam 50. Laser diode 67 is of a different optical wavelength than compared to laser diodes 25 and 30 in order to calibrate and hence compensate for phase shifts due to changes in the index of refraction of air. For this purpose, laser driver 66 is selectively energized during a calibration operation using a three-pole switch 70 that causes the primary ranging frequency $f_1$ to be removed at terminal 70a from the ranging laser driver 24 and applied to the calibration achromatizing driver 66 at terminal 70c.

This calibration could alternatively be provided by a separate set of frequencies and phase circuits, and run continuously, i.e., color laser could be modulated at 3000.035, giving a difference of 25 KHz.

Still another modification provided in the FIG. 2 embodiment is an automatic gain control (AGC) 43 having an input downstream of the band pass filter 42 and a control lead coupled to a control input of variable amplifier 41. By this AGC feature, should the return beam be attenuated due to diffraction, dirt, smoke, etc., the gain in the phase measurement circuit is automatically increased. A similar AGC circuit may be provided in the coarse phase measurement portion of circuit 35 when needed.

Another calibration switch 72 enables the user to calibrate the electronic system by switching contacts 72a and 72b from an open position to closed positions causing the coarse reference phase signal $f_4$ and a fine reference calibration phase signal $f_5$ of 10 KHz to the modulation input of the local laser driver 28. The result is to generate on beam 16 not only the local oscillator signal $f_2$ but also artificial calibration phase signals of $f_4$ and $f_5$ in order to calibrate the phase shift measurements occurring in circuitry 35. In activating calibration switch 72, the operator first places the calibration switch 70 in a neutral position connecting output line 14 to an unused terminal 70b so as to disable the ranging laser beam produced by driver 24 and laser diode 25. This prevents the ranging laser return beam from interfering with the calibration operation; alternatively, a shutter may be used on the transmit beam 12, or its return 12'. When the system has been calibrated by observing the output of the phase detection circuitry with reference beam 16 containing the calibration signals $f_4$ and $f_5$, the system can be adjusted for any residual phase shifts associated with the detectors 34 and 38 and the various band pass filters and phase detection circuits of phase measurement network 36. After completing the calibration, switch 72 is restored to its on condition causing contacts 72a and 72b to be open and the main ranging driver 24 is reenergized by placing switch 70 in the position shown in FIG. 2 connecting line 14 to contact 70a.

Circuitry 10 is shown to contain a first voltage variable oscillator and associated phase lock loop circuit 10a and a second voltage variable oscillator and associated phase lock loop circuit 10b for generating respectively the primary ranging frequency $f_1$ and the local signal $f_2$ in conjunction with a reference oscillator 10c that runs in this embodiment at 10 MHz. To produce the coarse reference phase $f_4$ and the fine calibration reference $f_5$ signals, an output of oscillator 10c is fed to a divide by 10 circuit 10d, the output of which is filtered by band pass filter 10e and passed on as the coarse reference phase signal $f_4$, here being 1 MHz. Similarly, a divide by 1000 circuit 10f divides down the reference oscillator output from 10 MHz to 10 KHz and this signal is filtered in a band pass filter 10g to produce the calibration signal $f_5$.

Figure 3:
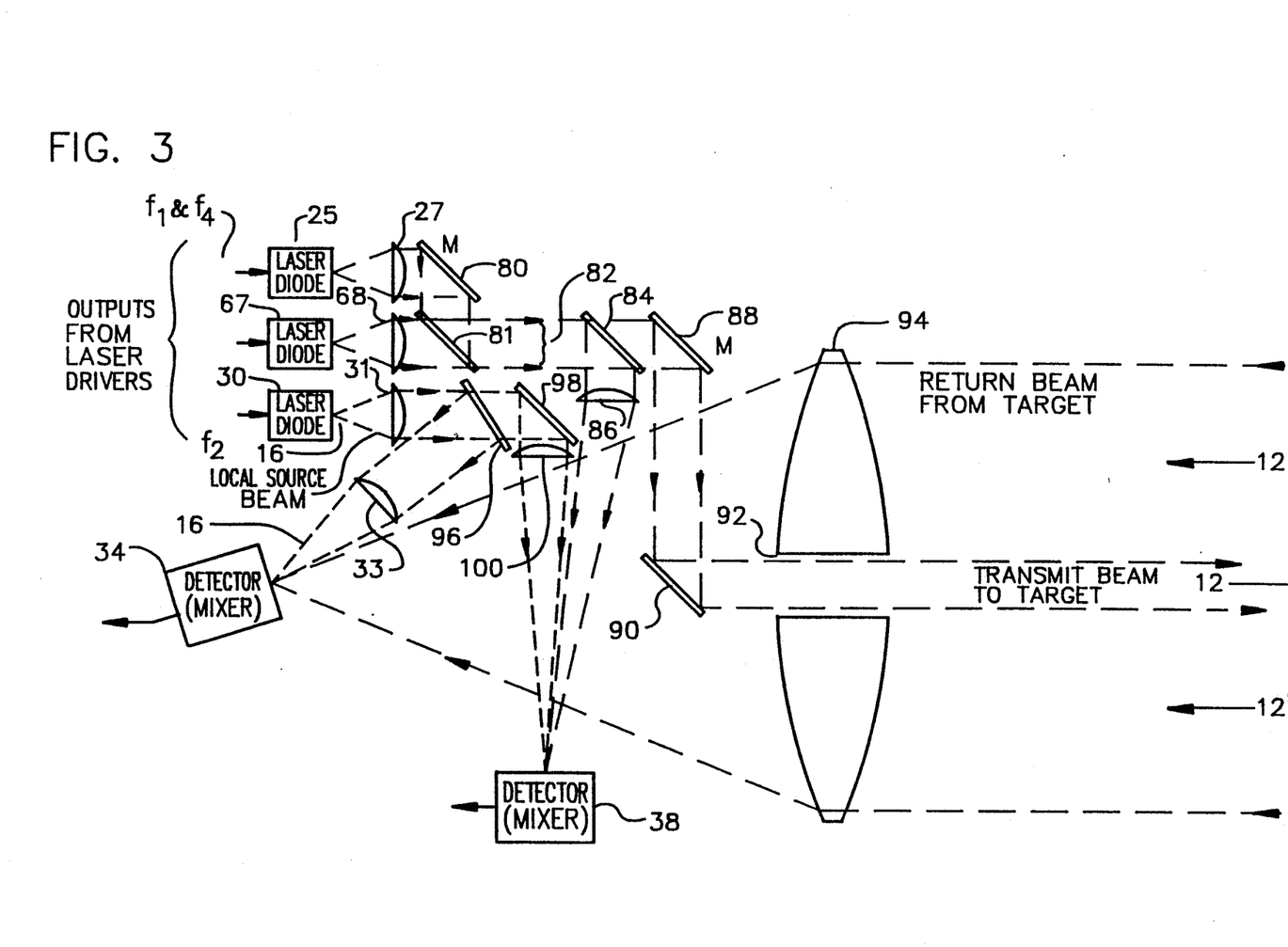
FIG. 3 is a more detailed diagram of a preferred arrangement for the optical and electro-optical components used in the alternate embodiment of FIG. 2.

FIG. 3 shows diagramatically the arrangement of a suitable optics system for implementing the multiple path, calibrating optics of the embodiment of FIG. 2. Thus, in FIG. 3, the set of laser diodes 25, 67 and 30 develop output laser light as described above, with collimating optics 27, 68 and 31. To form the transmit or ranging modulated beam 12, the collimated output beam from laser diode 27 is deflected by a diagonal mirror 80 and then through a diagonal dichroic beam splitter 81. A diagonal beam splitter 81 at the output of diode laser 67 and its collimating lens 68 direct the beam path from laser diode 25 into a common axis with the output beam from diode 67 to form a common axis beam path 82. The output light from laser diode 25 is combined with the index calibration light source from laser diode 67. Of course, the output of calibrate laser diode 67 is only energized during calibrate mode when the transmit diode 25 has been turned off and thus the beams from these diodes do not coexist but merely are directed along the same optical path indicated at 82. Alternatively, index calibration can be achieved by using an additional detector for receiving reference and return beams, the return beam being passed through a separate dichroic splitter.

A diagonal beam splitter 84 extracts part of the light in beam path 82 and directs the extracted light through a collecting lens 86 onto detector 38. The remaining beam energy is passed on through to another diagonal mirror 88 where the beam is deflected at right angles toward diagonal mirror 90 where the beam direction is changed again to form the main optical axis of the transmit or ranging beam 12. The main axis of the transmit beam 12 is passed through a central aperture 92 of a relatively large annular receiving lens 94 that has been sized for optimum capture of the back scattered light energy in return beam 12'.

One of the advantages of the present invention is that the reflection of light from the target need not be precisely and coherently directed onto the receiving detector and the alignment of the optics is not critical. All that needs to be done is to capture and focus enough of the returned back scatter (reflected) light in return beam 12' onto the detector so that the modulation information can be recovered. Hence, use of a relatively larger diameter receiving lens 94 compared to the cross section of the transmit beam 12 through center aperture 92 of lens 94 provides for collection of the majority of the back scattered return light for optimum ranging detection. The location of the various mirrors, beam splitters, and receiving lens are all mounted on suitable optic mounts within a housing of the system.

The local laser diode 30, produces beam 16 as before using a collimating optics 31 at the output of laser diode 30. Immediately beyond collimating optics 31, a diagonal beam splitter 96 extracts part of the beam energy and deflects it through focusing lens 33 onto the face of detector 34 where the light energy is combined with the focused returned beam 12' as described above in connection with FIG. 2.

It is observed that the optical axis of the return beam 12' focused on detector 34 and the heterodyne beam 16 focused through optics 33 onto the face of detector 34 are not coaxial. While in many optical ranging systems it is necessary to provide exact colinearity between the various optical paths in order to cause all the optical wave fronts to be coherent, such is not necessary in the present invention because the present system does not measure phase differences in optical wave fronts but rather measures the phase of the modulation and particularly the phase of heterodyned difference signals obtained from radio frequency modulations on the carrier light beams.

Beyond beam splitter 96, beam 16 continues toward a deflection mirror 98 oriented in this embodiment at an angle of less that 45° so as to redirect the remaining beam energy to and through focusing optics 100 where the beam energy is targeted on detector 38 along with the extracted ranging beam energy and calibration beam energy from optical path 82. Again, the impingent light energy on detector 38 is received over two different non-aligned optical axis which is acceptable in the present invention because the detection process does not require precise optical wave front information. As described above in connection with FIG. 2, detectors 34 and 38 provide respectively the functions of detecting and mixing the heterodyned modulation information (detector 34) and for forming the phase reference signal information (detector 38).

Figure 4:
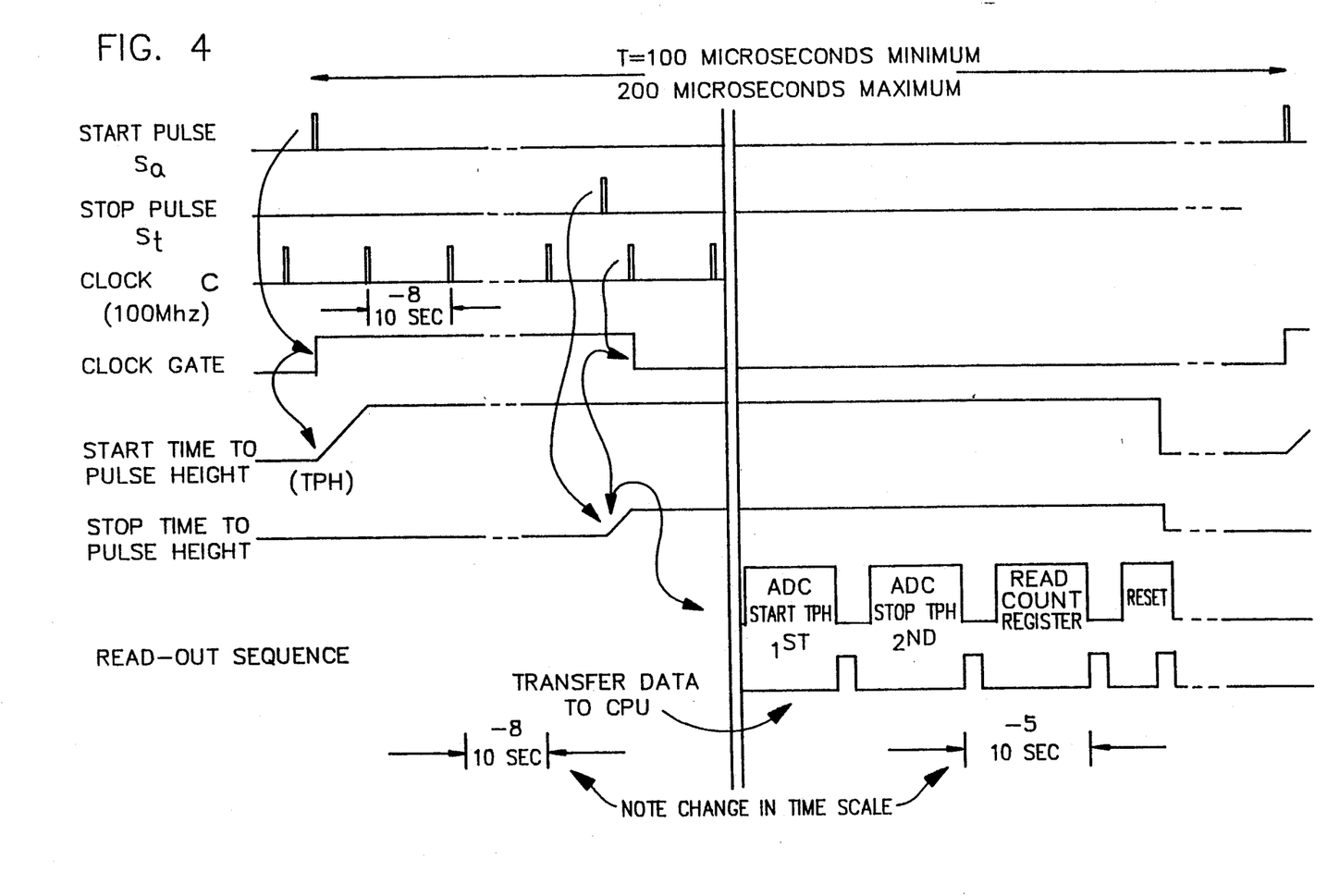
FIG. 4 is a timing and waveform diagram of a fine distance phase detection circuit (see FIG. 5) used in a preferred embodiment of the invention.
Figure 5:
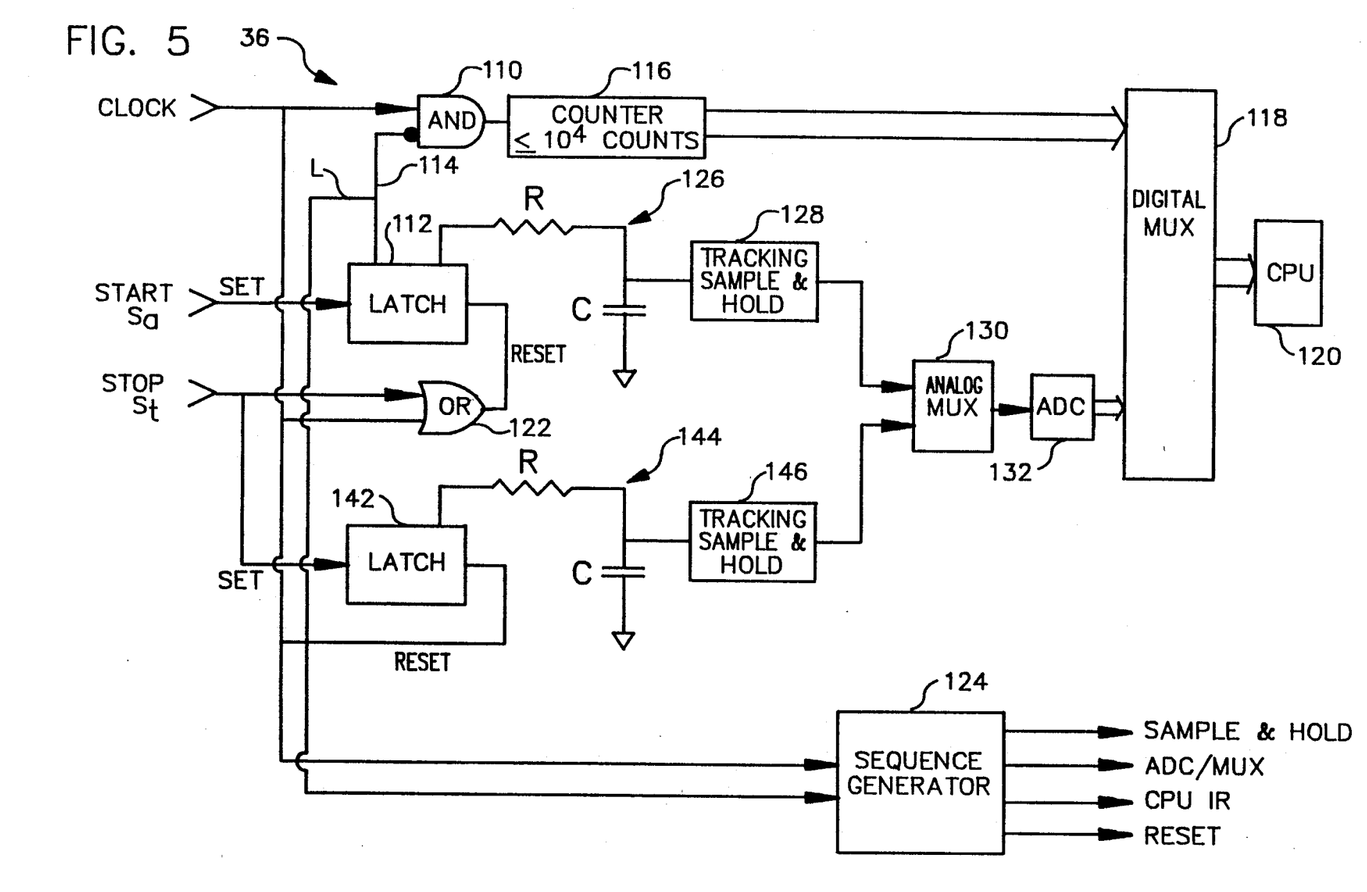
FIG. 5 is a combined block and schematic diagram of a preferred logic circuit for performing the phase timing measurements illustrated in FIG. 4.

FIGS. 4 and 5 show respectively a timing and waveform diagram (FIG. 4) and schematic-block diagram (FIG. 5) of a preferred implementation of the fine distance phase detector 36. In implementing the principle features of the invention, the accuracy of the fine distance measurement scheme depends upon the system's ability to resolve relatively small phase differences between the ranging signal and the reference phase. As illustrated in the timing and waveform diagram of FIG. 4, this resolution is achieved in the presently disclosed embodiment by measuring phase differences between a start pulse $S_a$ representing the phase crossover point (obtained by conventional wave shaping circuits) of one of the input phase signals to phase detector 36, and a stop pulse $S_t$ representing the phase of the other phase signal. In this nomenclature, the start pulse $S_a$ starts a timing interval; the stop pulse $S_t$ stops the measurement and thus ends the time interval. The respective start and stop pulses are generated by conventional, well known phase shaping and crossover trigger circuitry capable of receiving the raw band passed filtered output signals $f_1' - f_2'$ and $f_1 - f_2$ as shown in FIGS. 1 and 2 and producing sharply defined start and stop pulses representing a zero crossover points of the respective input signals to the phase detector.

In the embodiment shown in FIG. 4, the time interval is measured in a two-stage fashion by counting the number of a series of clock pulses C and hence totalizing the elapsed time interval represented by the number of such pulses, and measuring the fractional time intervals occurring between the start pulse $S_a$ and the first clock pulse C, and between the stop pulse $S_t$ and the succeeding clock pulse C (the leading fractional interval being added and the trailing fractional interval being subtracted from the accumulated time).

As shown in the timing and waveform diagram of FIG. 4, the initial fractional time interval is measured by a 1st time to pulse height (tph) measurement in which an RC circuit charges a capacitor during the pertinent time interval which is then held as an analog measure and converted by analog-to-digital converter (ADC) and multiplexed to a CPU for storage. Similarly, the trailing fractional interval is also measured by a 2nd time-to-pulse height (tph) measurement of the related charge on a capacitor of another RC circuit that is sampled, held and multiplexed through an analog-to-digital converter for storage in the memory of a CPU or for other downstream processing. The 2nd time-to-pulse height interval representing the trailing fraction is subtracted in the CPU from the full interval and the 1st or initial fractional interval is summed into the resulting total.

With further reference to FIG. 4 and FIG. 5, the initial and trailing time-to-pulse height intervals are measured and processed and stored as follows. As shown in FIG. 5, a processing circuit for the interval measurement and hence phase detection includes an initial gate 110 that is enabled by a latch 112 whenever a start pulse $S_a$ occurs setting latch 112 and causing an output over lead 114 to enable one input of gate 110. When this occurs, the gate 110 passes the stream of clock pulses C into a counter 116 which accumulates the counts and hence the number of full clock intervals occurring following the start pulse $S_a$. This count information is multiplexed by digital multiplexer 118 into a CPU 120 having suitable storage such as RAM, as well as non-volatile memory which may be in the form of disk, tape, or other storage. The accumulation of full interval clocks by means of counter 116 fed through gate 110 is terminated by a reset signal applied to latch 112 via the occurrence of the stop pulse $S_t$ operating in conjunction with a clock pulse C through OR gate 122.

The output L on lead 114 from latch 112 initiates a timing sequence provided by a sequence generator 124 that produces time coordinating signals of S/H (sample and hold control); ADC (analog-to-digital conversion enabling signal); CPU iR (interrupt); and reset (for resetting the counter and tracking sample and hold circuits). Sequence generator 124 may be provided by any suitable state machine device capable of generating a sequence of timed or otherwise fixed programmed output signals in response to a reference time pulse such as signal L.

The initial fractional clock interval between the start time $S_a$ and the first clock signal is measured as follows. An RC network 126 is energized by an output of the latch 112 to initiate an RC charging of the capacitor whenever the start pulse $S_a$ occurs setting latch 112. The capacitor C accumulated charge is proportional to the time interval in which latch 112 is in the set state and the charging is terminated upon reset of latch 112 by the stop pulse $S_t$ or the next clock pulse applied to the reset terminal through gate 122. To measure the accumulated charge and hence time interval on the capacitor, a tracking sample and hold circuit 128 operated in coordination with the S/H sequence signal from generator 124 samples the charge on the capacitor of network 126 and feeds it to an analog multiplexer 130 which in turn is converted to digital by analog-to-digital converter 132 and then multiplexed by digital multiplexer 118 to CPU 120. Similarly, the stop fractional time interval includes a latch 142 that has associated precision RC network 144, a tracking sample and hold circuit 146 that develops the analog value of the terminal fractional time interval between the stop pulse $S_t$ and the succeeding clock pulse. The readout sequence (during which accumulated values on the capacitors of networks 126 and 144 are read) is illustrated by the readout sequence operation shown in FIG. 4 at the changed slower time scale on the right hand side of the diagram. The 1st tph value converted by ADC 132 is transferred to the CPU during a transfer time pulse shown at the trailing edge of the interval marked ADC 1st tph. Similarly, the trailing or 2nd tph interval is converted and transferred to the CPU followed by a readout of the register provided in counter 116 followed by a reset signal after the series of readout sequences at the termination of these readout operations. The result is the accumulated total time interval between the start pulse $S_a$ and the stop pulse $S_t$ measured to a high degree of accuracy considering the small time intervals that are involved, such as measurements of 100 microseconds down to $10^{-10}$ seconds. These timing measurements correspond respectively to intervals of 10 cm down to 0.01 microns in distance.

While the preferred timing interval measurement process for phase detector 36 is shown in the preferred forms in FIGS. 4 and 5, alternatively, the measurements may be performed by other techniques, including a Vernier chronotron. Such a system is described in Rev. Sci. Instrum., Vol. 30, No. 3, p. 159-166, 1959, and that description is incorporated herein by reference. Also, the coarse phase detector 48, being operated under less stringent conditions, may use a conventional (hence not shown) phase detector circuit of which a number of well known, commercially available devices exist.

Figures 6, 7:
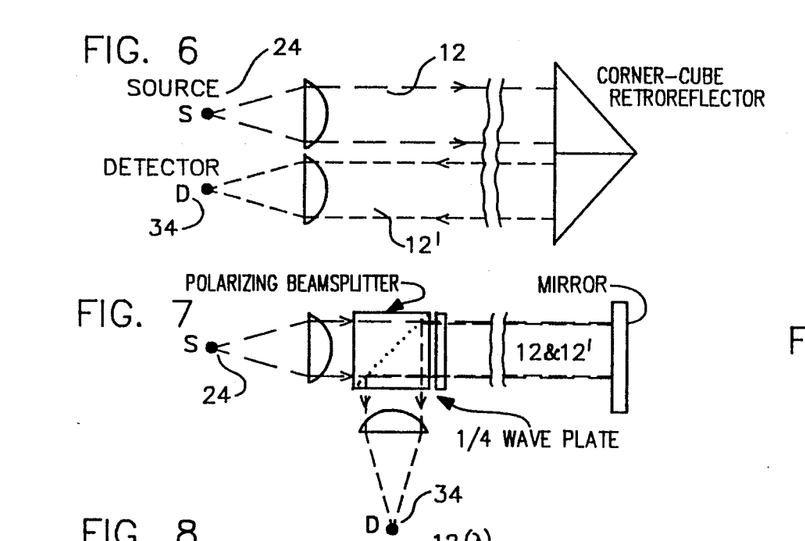
FIGS. 6, 7, 8, 9, 10 and 11 are alternative optical arrangements for the transmission to and return of the modulated light beam from the target.
Figure 8:
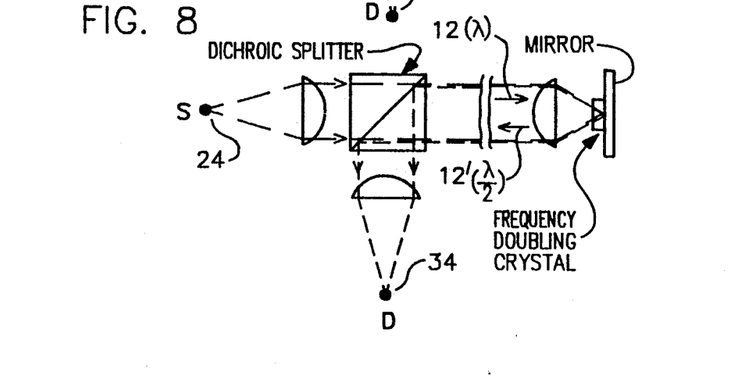

Now with reference to the alternative optical arrangements of FIGS. 6 through 11, FIG. 6 shows an off-axis retro-reflector at the target for separating the transmit and return paths of the modulated light beams 12 and 12'. FIG. 7 uses an on-axis reflection mirror at the target and causes the transmit and return beams to be separated by polarizing filters and a polarized beam splitter device as illustrated. FIG. 8 is another on-axis optical arrangement using a known reflector crystal device at the target which doubles the frequency of the return beam carrier which is then detected with a dichroic beam splitter. The transmit beam 12 is, for example, at an optical wavelength 1 lambda and the return beam 12' is at an optical wavelength of ½ lambda.

Figures 9, 10:
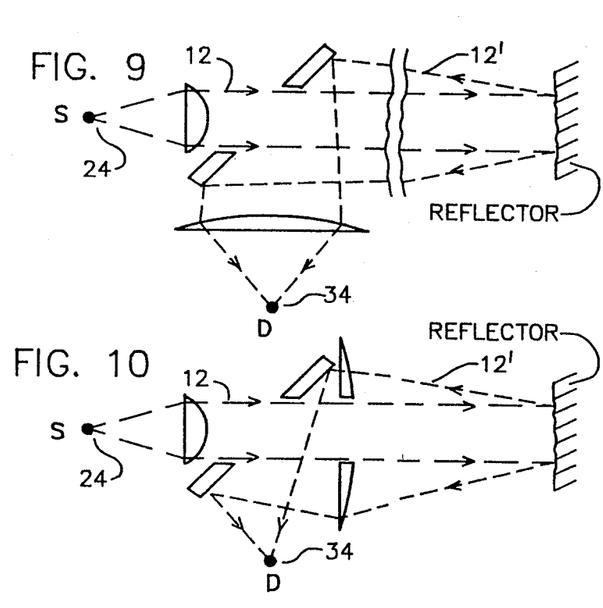
Figure 11:
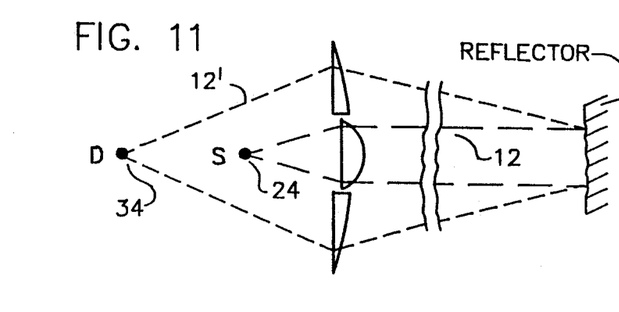

FIGS. 9, 10 and 11 show various optical arrangements in which the reflection off the target is not as precise as the variations in FIGS. 6, 7 and 8. In FIGS. 9, 10 and 11, backscatter from an imperfect target reflective surface are collected in various types of annular collection optics as illustrated. These variations are similar to the annular collection optics of receiving lens 94 shown and described in the embodiment of FIG. 3 above. The variations in FIGS. 9, 10 and 11 are suitable in applications where the backscatter from the target does not require a strong return beam signal due to perhaps a short distance of travel on the target.

Figure 12:
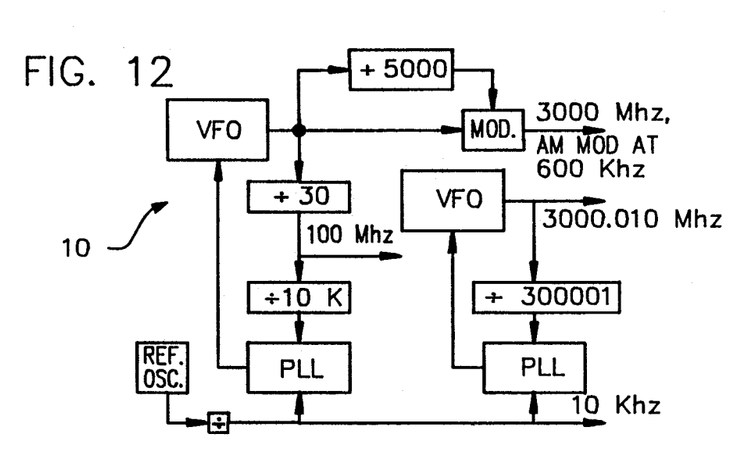
FIGS. 12, 13 and 14 are various alternative configurations for generating the RF frequencies of $f_1$, $f_2$, and $f_3$ referred to in the embodiment of FIG. 1.
Figure 13:
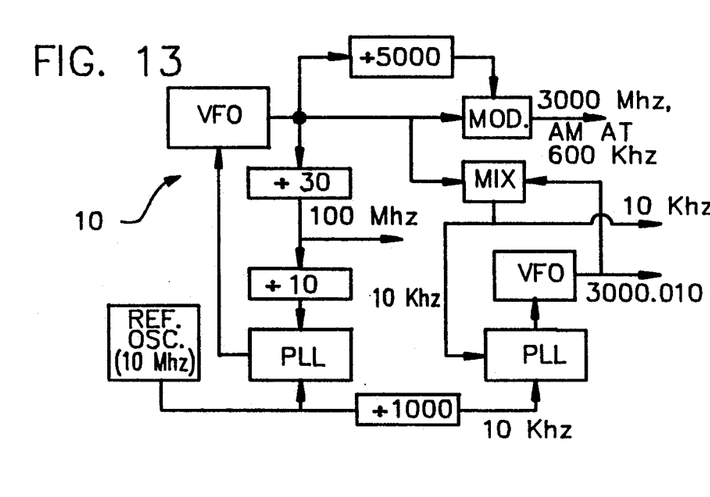
Figure 14:
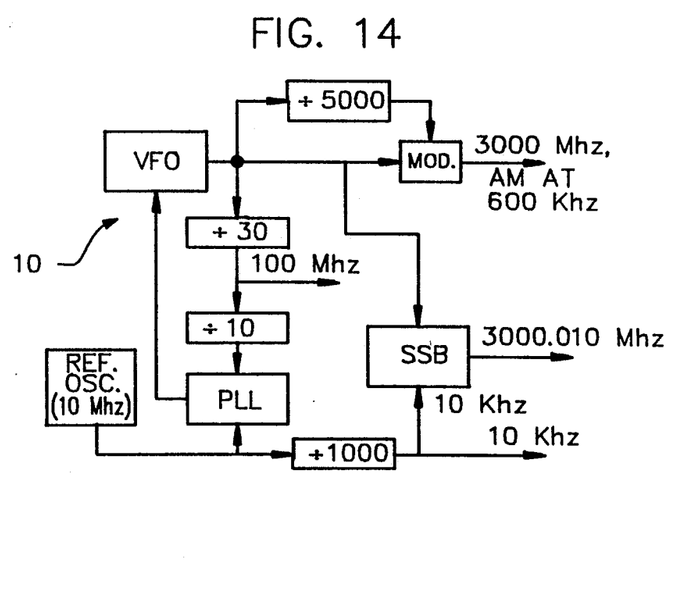

With reference to the alternative RF generation networks 10 of FIGS. 12, 13 and 14, FIG. 12 shows the use of two separate phase lock loop (PLL) chains to produce the primary frequency of 3,000 MHz and the offset frequency of 3,000.01 MHz. As shown in FIG. 12, the coarse ranging frequency of 600 KHz is obtained by amplitude modulating the primary frequency of 3,000 MHz rather than using a differencing operation as in the case of the embodiment of FIG. 1. FIG. 13 shows an RF generation scheme in which the primary frequency generated by a first variable frequency oscillator (VFO) is mixed with a second VFO controlled by a separate PLL so as to produce the lower 10 KHz reference frequency. FIG. 14 shows a single PLL and VFO system in which dividers and a single sideband with suppressed carrier (SSB) generate the offset frequency of 3,000.01 MHz.

It will therefore be appreciated that the principles of the present invention provide a highly reliable, accurate measurement system for use on relatively small incremental intervals down to a resolution of 0.01 microns or less, which is suitable for such applications as machine tool control and quality control. The key to this measurement system is the use of a relatively high frequency RF modulation on a ranging light beam, namely, an amplitude modulated diode laser output, together with a local RF modulation signal on a local light beam functioning like a local oscillator in a heterodyne RF receiving system. By heterodyning the modulated information on the second or local modulated laser light source, with the modulation signal on the ranging beam, a relatively lower RF frequency difference signal is produced which has a distance dependent phase that varies with the phase of the substantially higher frequency RF modulation on the ranging beam.

The distance measurement is absolute in two senses. First, the measurement accuracy depends only on time, and the second, total distances are read out directly. That is, it is not an incremental counting technique that requires keeping track of the number of phase shifts that have occurred throughout the measurement process. Because the modulations of the laser light beams are relatively narrow band, the circuits that modulate, receive and process the resultant signals are fairly inexpensive and reliable. While the preferred embodiment described above has chosen a value of 3,000 MHz as the primary ranging modulation frequency, higher frequencies may provide better resolution. The upper limit of such higher frequencies will be determined by the availability of laser diodes and their modulation drivers. Currently, devices are available at a reasonable cost that have response or band width limits that begin to be approached at the 10,000 MHz level. Gas lasers, on the other hand, can be used; however, the modulation limit in present equipment is about 500 MHz and must be done with electro-optical crystals, the cost of which is significantly greater than diode laser modulation schemes.

The higher the modulation frequency, the better precision and the higher cost for the laser, modulator and phase lock loop (PLL). At the present time, lasers are available as a manufacturers stock item that can be modulated up to 12,000 MHz. Dynamic counters are available up to 12,000 MHz also, so that a PLL can be built for a laser modulator up to 12 GHz. Static counters are available up to 4 GHz. And logic circuits and gate arrays are available that are based on GaAs semiconductor material that have gate delay times of less than 100 picoseconds.

These availabilities mean that, for highest performance:
1. The lasers could be modulated at 12 GHz and phase locked to a reference oscillator.
2. The clock frequency for the phase detector counter could be 4 GHz.
3. Switching logic for control and for the time-to-pulse-height or vernier chronotron is compatible with these frequencies.

The selection of the difference frequency depends more on the specific application than on the state of the art. A small difference means that more time is available per cycle to measure the period, so the precision can be better. However, the longer measuring time may not be suitable for time dependent applications, such as machine tool control. Also, even though the PLL can control the average phase very accurately, there is some instantaneous variation, or phase noise. The amplitude of this noise drops very rapidly with frequency difference. Both from a time and noise perspective, the difference frequency should not be less than 1000 Hz.

The selection of the ambiguity frequencies depend almost entirely on the application, in particular on the maximum range.

The precision of the time-to-pulse-height circuits are between 8 bits and 9 bits, i.e., one part in 256 or 512. The resolution is higher, about one in 1024.

Recognizing that higher performance means higher cost, here are some examples of complete systems:

I. High precision
a. Modulation frequency 10 GHz, a wavelength of 30 m.
b. Frequency difference of 100 KHz.
c. Counter frequency of 1 GHz.
d. Ambiguity frequency of 1 MHz, a wavelength of 300 meters.

In the phase circuit, the phase difference of the 10 KHz frequency would be measured by counting the 1 GHz clock, and filling in with a fine measurement of 1/1000 of the clock period. The fine measurement would have an error band of about 1%. When averaged over 10 cycles, the total precision of one phase measurement would be one in 60,000,000, or in terms of distance, 30 mm/60000000=0.0005 microns. The actual target motion precision would be one half of that, or 0.00025 micron. The measurement update rate would be 1000/sec.

II. Lower cost, lower precision, higher speed
a. Modulation frequency 1 GHz, a wavelength of 300 mm.
b. Frequency difference of 10 KHz.
c. Counter frequency of 100 MHz.
d. Ambiguity frequency of 1 MHz.

The precision per cycle is one part in 1,000,000. The primary wavelength is 300 mm (10×larger than the high precision system), so the actual target motion precision would be 0.15 micron. There is no averaging, and the update rate is 10,000/sec.

III. Medium cost, high update rate
a. Modulation frequency 5 GHz, a wavelength of 60 mm.
b. Frequency difference of 1 MHz.
c. Counter frequency of 1 GHz.
d. Ambiguity frequency of 1 MHz.

The precision per cycle is one part in 1000,000, or a target motion precision of 0.3 micron. The update rate is 1,000,000/sec.

IV. Low cost, slow speed, medium precision
a. Modulation frequency 1 GHz.
b. Frequency difference of 1000 Hz.
c. Counter frequency of 100 MHz.
d. Ambiguity frequency 1 MHz.

The precision per cycle is one part in 10,000,000. The wavelength is 300 mm, so the target precision is 0.03 micron, with an update rate of 1000/sec.

While only particular embodiments have been disclosed herein, it will be readily apparent to persons skilled in the art that numerous changes and modifications can be made thereto, including the use of equivalent devices and method steps without departing from the spirit of the invention. For example, the above described embodiments use a second laser light source modulated with the local radio frequency to form the difference signal that is then processed for phase. The ranging light beam and the second heterodyne light source are directed onto a detector, namely detector 34, as described above to form the difference phase signal. In an alternative embodiment, it is comtemplated that a higher frequency response detector may be used in place of detector 34 so as to detect the relatively high frequency ranging RF modulation, namely 3,000 MHz in this example, and then inject the local oscillator signal downstream of the detector by purely electronic signal heterodyning. The detector in such case would cost more and perhaps be subject to other operational limitations; however, it is an alternative that may be available to cause the heterodyning of the ranging phase down to a low enough radio frequency to enable processing by the phase detection circuit 35. Also, in such an embodiment, the second laser beam modulation and laser diode, namely driver 28 and laser diode 30 in the embodiments of FIGS. 1 and 2 are eliminated.

Another alternative that is contemplated is to use a different form of calibration for the unknown index of refraction through which the ranging beam 12 is propagated. Such an alternative would require the use of a fixed cavity, i.e., a cavity of known dimensions, open to ambient atmosphere and made of materials that have substantially no temperature coefficient of expansion or a small enough coefficient so as to create no significant expansion error. Invar and Zerodur are available materials that can meet these requirements. In such a cavity made of these or similar materials, some light energy would be split off from each laser beam and a separate detector used to measure the apparent length of the cavity that has been exposed to the ambient atmosphere. Since the true length of the cavity is known, a calibration correction is then made to the measurement signals.

Another way of achieving the high speed measurement is to use a local frequency for the second light source that is 2 MHz different from the primary radio frequency. The resultant resolution would not be as precise in measuring distances; however, the measurement would still produce a resolution of 1 microsecond or better, which would be equal to 1 micron at a speed of 1 meter/second. Such difference frequency could be in addition to the 10 KHz difference. Still another variation for such purpose would be to raise the 100 MHz clock to 1 GHz in order to cause a tenfold increase in the intermediate frequency without losing resolution.

Still another variation of the above disclosed embodiments is the use of a Doppler shift that occurs in the measurement phase signals when the part or distance to be measured is changing. For example, in a machine tool case that is moving at 1 meter per second, a measurable Doppler shift occurs in the first ranging beam, i.e., the 3,000 MHz beam. This Doppler shift will amount to a fraction equal to the ratio of the velocity of the speed of light, or roughly 1 divided by $300 \times 10^6$ which would cause an apparent shift of ten cycles out of the fundamental 3,000 MHz cycles. This is a small effect, but in this same example, the difference frequency will still be only ten cycles from 10 KHz so that an error or measurable Doppler shift of 1/1000ths of a wavelength would occur. This represents a value of 10 microns. If such a Doppler shift produces an undesirable lapse in accuracy, one solution is to increase the difference frequency or to sense the shift in the difference frequency and calculate a compensation. The shift in difference frequency can be established by a discriminator circuit that is part of the 10 KHz narrow band filter or more efficiently by directly measuring the clock time of the difference frequency.

I claim:

1. An optical distance measurement system comprising:
    means for producing a first light beam for transmission over a distance that is to be measured and including means for amplitude modulating the first light beam with a first radio wave frequency, the phase of such first radio frequency amplitude modulation at any given location on the beam being dependent on the transmission distance;
    means for producing a second light beam that is not transmitted over such distance, and including means for amplitude modulating the second light beam with a second radio wave frequency functioning as a local signal source;
    an electro-optical detecting means for receiving said first and second light beams and functioning as a mixer to cause electro-optical heterodyning of said first and second radio wave frequencies modulated on the first and second light beams respectively, said electro-optical heterodyning producing a resultant difference radio frequency signal representing the phase of said first radio wave frequency after transmission of the first light beam over such distance; and
    phase measuring means responsive to said resultant difference radio frequency signal for producing an output signal representing distance.

2. The optical distance measurement system of claim 1 further comprising:
    said phase measuring means including means for generating a third radio frequency functioning as a phase reference at the resultant difference radio frequency from the electro-optical heterodyning in said electro-optical detecting means, and means for comparing the phase of the resultant difference radio frequency signal and the phase of the third radio wave frequency.

3. The optical distance measurement system of claim 2 wherein:
    said means for generating said third radio wave frequency comprises an electronic mixer that mixes the first and second radio wave frequencies prior to said means for amplitude modulating the first and second light beams.

4. The optical distance measurement system of claim 2 wherein:
    said means for generating said third radio wave frequency comprises means for electro-optically heterodyning the first and second radio wave frequencies after said means for amplitude modulating said first and second light beams with the first and second radio wave frequencies respectively and before transmission of the first light beam over said distance that is to be measured, thereby compensating for spurious phase shifts in said means for producing and modulating said first and second light beams.

5. The optical distance measurement system of claim 1 further comprising:
    means for amplitude modulating said first light beam with a fourth radio frequency to cause an additional distance dependent phase on said first light beam, whereby ambiguous distance dependent phase measurements of said resultant difference radio frequency are resolved by measuring the phase of the fourth radio wave frequency after the first beam has been transmitted over such distance.

6. The optical distance measurement system of claim 2, further comprising:
    automatic gain control means coupled to said electro-optical detecting means for varying the gain of said resultant difference radio frequency signal to compensate for changes in the signal strength of the first light beam as received by said electro-optical detecting means after transmission over such distance.

7. The optical distance measurement system of claim 2, further comprising:
    index of refraction calibration means including means for producing a third light beam at light wavelength substantially different from that of said first light beam and optical means for transmitting said third light beam over substantially the same distance as said first light beam, whereby phase shifts in said first and third light beams due to different index of refraction of beam transmission medium is thereby calibrated.

8. The optical system of claim 2, further comprising:
    a first phase detector means for receiving said resultant difference radio frequency and said third radio frequency, and producing an output signal representing fine distance measurement.

9. The optical system of claim 8, further comprising:
means for amplitude modulating said first light beam with a fourth radio frequency to cause an additional distance dependent signal phase on said first light beam;
means for producing an additional reference phase not dependent on distance relative to which said additional distance dependent signal phase is measured; and
a second phase detector means for receiving said additional distance dependent signal phase and said additional reference phase and producing an output signal representing coarse distance measurement.

10. The optical distance measurement system of claim 1, further comprising:
means for reflecting said first light beam at a target to cause a return of said first light beams to said electro-optical detecting means.

11. The optical distance measurement system of claim 10, wherein said means for reflecting said first light beam at a target comprises a crystal means for changing the wavelength of light in said first light beam at the target so that the return thereof is at a different light frequency, whereby the return light can be separated from the initial transmit light of said first beam.

12. An optical distance measurement system comprising:
means for producing a first light beam for transmission over a distance that is to be measured and including means for amplitude modulating the first light beam with a first radio frequency having a phase, relative to the phase of a reference frequency that is equal to said first radio frequency, that is dependent on distance;
means for producing a second light beam that is not transmitted, and including means for amplitude modulating it with a second radio frequency functioning as a local signal source;
an electro-optical detecting means for receiving said first and second light beams and functioning as a mixer to cause electro-optical heterodyning of said first and second radio frequencies modulated on the first and second light beams respectively, said electro-optical heterodyning producing a resultant difference radio frequency signal the phase of which is representative of the relative phase of said first modulated light beam; and
phase measuring means responsive to said resultant difference radio frequency signal for producing an output signal representing distance.

13. An optical distance measurement system comprising:
a radio frequency generator means for generating single and dual frequency modulation signals, the single and dual frequency modulation signals being electronically mixed, for developing first and second beat reference signals each defining a reference phase;
a ranging laser having a return and driven by the dual frequency modulation signal;
a local laser having an output and driven by the single frequency modulation signal;
an electro-optical detecting means for electro-optically heterodyning said return of said ranging laser and said output of said local laser;
optical means for directing the output of the local laser and the return from the ranging laser on the electro-optical detector means for developing a heterodyne signal representing fine distance measurement and a coarse signal representing relatively longer distance, the heterodyne and coarse signals each having a phase that varies with distance; and
phase comparing means for comparing the phase of the heterodyne signal representing fine distance measurement and the coarse signal representing longer distance with the respective first and second beat reference signals, said phase comparing means having a first output of a precision distance measurement signal obtained by phase comparison of a relatively low frequency difference of the single frequency modulation on the local laser and one of the dual frequencies modulated on the ranging laser, and having a second output of a signal resolving distance ambiguities in such first mentioned phase comparison by phase comparison of the second beat reference signal and coarse signal.

14. The optical distance measurement system of claim 13, wherein said dual frequency modulation signals are represented by $f_1$ and $f_3$, said single frequency modulation signal is represented by $f_2$, and the heterodyne signal representing fine distance measurement is the difference signal resulting from $f_1-f_2$ and the coarse signal is the difference signal resulting from $f_1-f_3$.

15. A method of measuring distance by electro-optical light transmission and radio frequency modulation of light comprising:
transmitting a first light beam over a distance that is to be measured and amplitude modulating the first light beam with a first radio wave frequency, the phase of such first radio frequency amplitude modulation at any given location on the beam being dependent on the transmission distance;
producing a second light beam that is not transmitted over such distance, and amplitude modulating the second light beam with a second radio wave frequency functioning as a local signal source for heterodyning with the first radio wave frequency;
electro-optically detecting and mixing said first and second light beams to cause electro-optical heterodyning of said first and second radio wave frequencies modulated on the first and second light beams respectively, said electro-optical heterodyning producing a resultant difference radio frequency signal representing the phase of said first radio wave frequency after transmission of the first light beam over such distance; and
producing a distance measurement signal from said resultant difference radio frequency signal.

16. Method of measuring the distance of claim 15 further comprising:
generating a third radio frequency functioning as a phase reference at the resultant difference radio frequency from the electro-optical heterodyning in said electro-optical detector, and comparing the phase of the resultant difference radio frequency signal and the phase of the third radio wave frequency to produce said distance measurement signal.

17. The method of measuring distance of claim 16 wherein:
said step of generating said third radio wave frequency comprises mixing the first and second radio wave frequencies prior to amplitude modulating the first and second light beams.

18. The method of measuring distance of claim 16 wherein:
said step of generating said third radio wave frequency comprises electro-optically heterodyning the first and second radio wave frequencies after amplitude modulating said first and second light beams with the first and second radio wave frequencies respectively and before transmitting the first light beam over said distance that is to be measured, thereby compensating for spurious phase shifts in producing and modulating said first and second light beams.

19. The method of measuring distance of claim 1 further comprising:
amplitude modulating said first light beam with a fourth radio frequency to cause an additional distance dependent phase on said first light beam, whereby ambiguous distance dependent phase measurements of said resultant difference radio frequency are resolved by measuring the phase of the fourth radio wave frequency after the first beam has been transmitted over such distance.

20. A method of optical distance measurement for machine tool, quality control and similar applications comprising:
producing a first laser light beam for transmission over a distance that is to be measured and amplitude modulating the first light beam with a first radio frequency having a phase that is dependent on distance and is measured relative to the phase of a reference frequency that is equal to said first radio frequency;
producing a second laser light beam that is not transmitted over such distance, and amplitude modulating it with a second radio frequency functioning as a local signal source for heterodyning with the first radio frequency;
electro-optically detecting and mixing said first and second laser light beams to cause electro-optical heterodyning of said first and second radio frequencies modulated on the first and second laser light beams respectively, said electro-optical heterodyning producing a resultant difference radio frequency signal the phase of which, relative to the phase of a reference radio frequency equal to the said difference radio frequency signal, is representative of the change in phase of said first modulated light beam due to its transmission over the distance to be measured; and
comparing the phase of said resultant difference radio frequency signal and the phase of said reference radio frequency to produce an output signal representing a measured distance.

* * * * *